United States Patent [19]
Padegs et al.

[11] 3,947,823
[45] Mar. 30, 1976

[54] MEANS FOR COORDINATING ASYNCHRONOUS MAIN STORE ACCESSES IN A MULTIPROCESSING SYSTEM USING VIRTUAL STORAGE

[75] Inventors: Andris Padegs, Poughkeepsie; Ronald Morton Smith, Wappingers Falls, both of N.Y.

[73] Assignee: International Business Machines Corp., Armonk, N.Y.

[22] Filed: Dec. 26, 1973

[21] Appl. No.: 428,276

[52] U.S. Cl. ............................................. 340/172.5
[51] Int. Cl.[2] ............................................. G06F 9/18
[58] Field of Search .................................... 340/172.5

[56] References Cited
UNITED STATES PATENTS

| | | | |
|---|---|---|---|
| 3,421,151 | 1/1969 | Quosig et al. | 340/172.5 |
| 3,647,348 | 3/1972 | Smith et al. | 340/172.5 X |
| 3,665,404 | 5/1972 | Werner | 340/172.5 |
| 3,716,837 | 2/1973 | Waddell | 340/172.5 |
| 3,825,904 | 7/1974 | Burk et al. | 340/172.5 |
| 3,828,327 | 9/1974 | Berglund et al. | 340/172.5 |

*Primary Examiner*—David H. Malzahn
*Attorney, Agent, or Firm*—Bernard M. Goldman

[57] ABSTRACT

A unique control circuit that maintains the addressability to an invalidated page frame until execution is completed for all current instructions in all CPUs of a multiprocessing system which uses demand-paging and virtual addressing.

A support method is also disclosed which provides an asynchronous sequence of operations for each CPU in the multiprocessing system to maintain the page in the invalidated page frame available to all CPUs until their current instruction execution is completed. The last CPU to complete its execution moves the page, if modified, out of the page frame.

4 Claims, 8 Drawing Figures

FIG. 3 (INITIATION OF PAGE FRAME INVALIDATION BY ANY CPU)
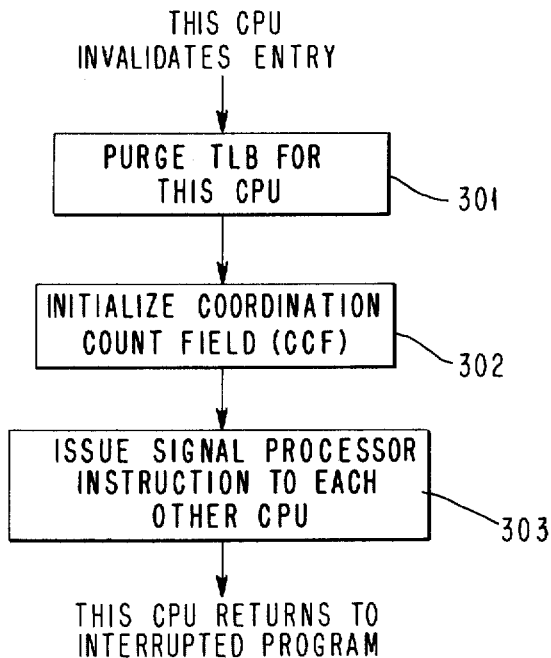
FIG. 6
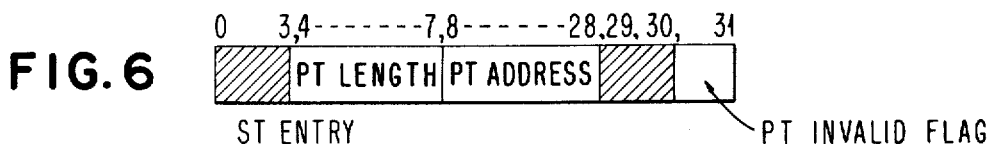
FIG. 7
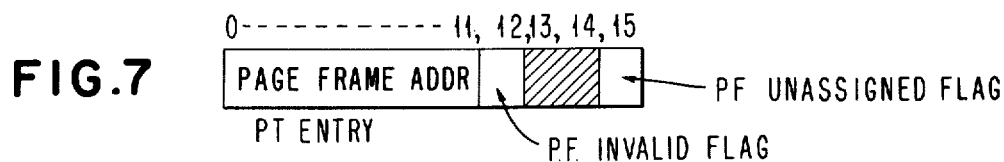
FIG. 8

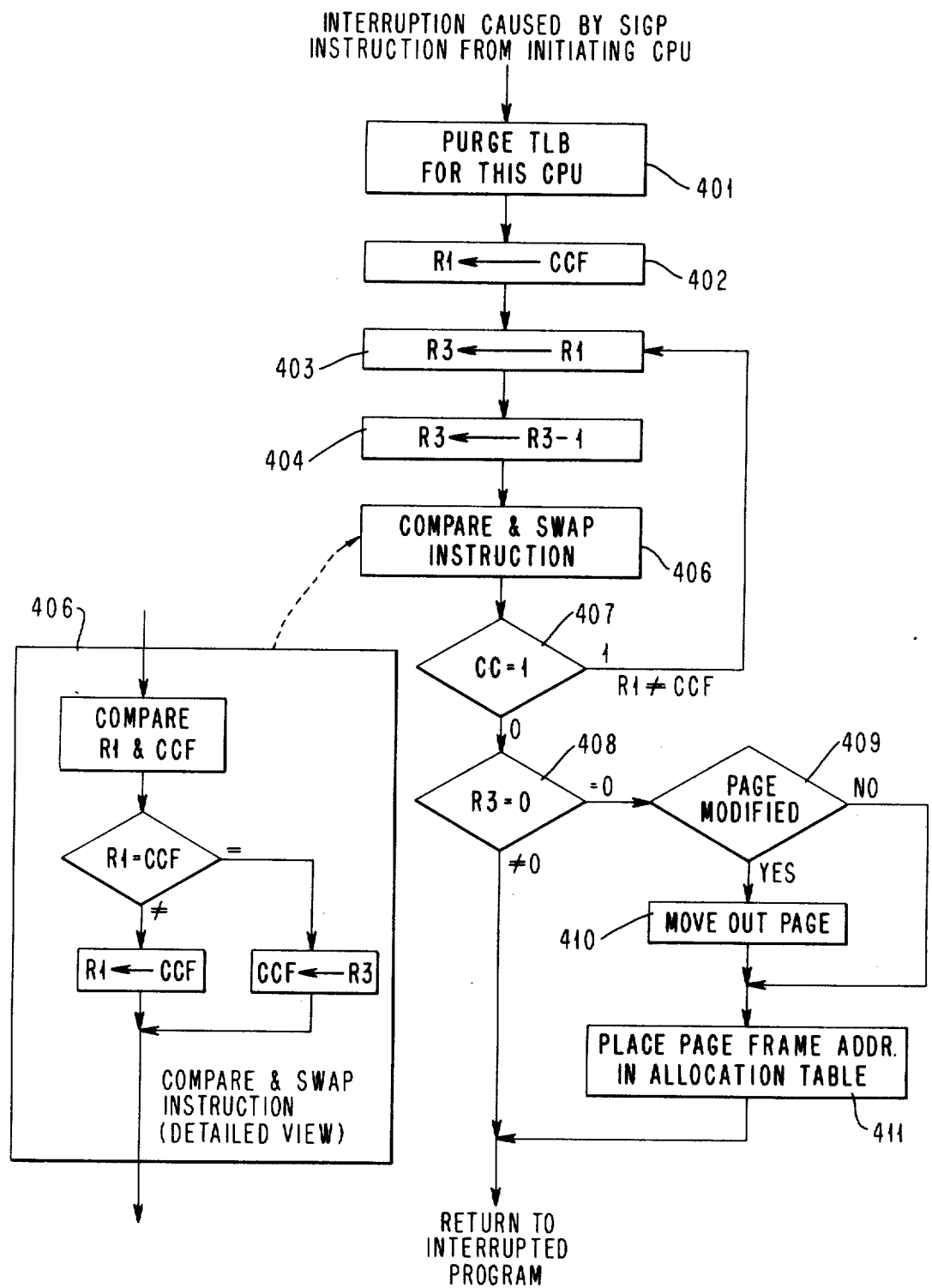
FIG. 4 (RESPONSE BY EACH OTHER CPU IN SYSTEM)

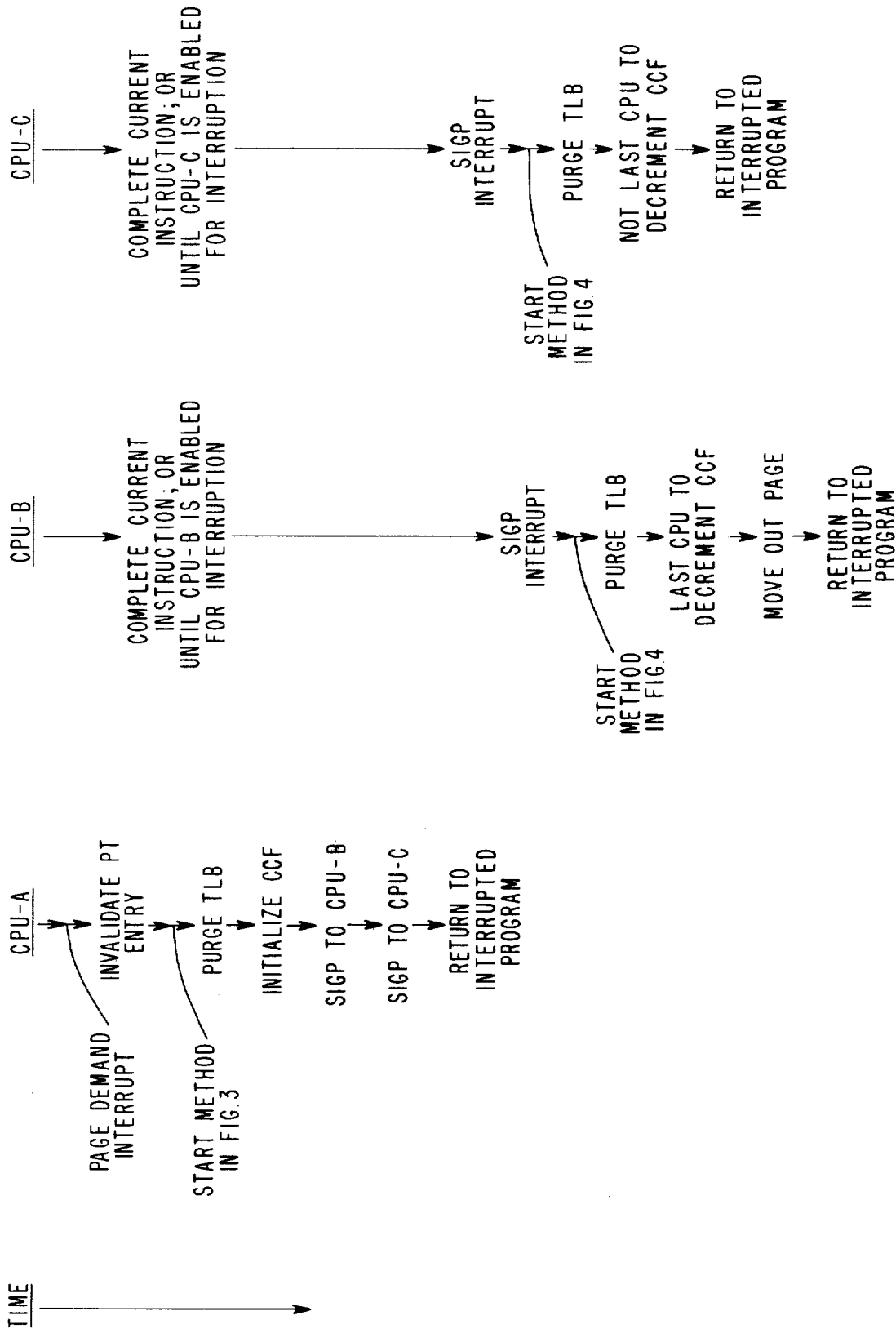
FIG. 5 (TIMING DIAGRAM OF EXAMPLE)

– 1 –

MEANS FOR COORDINATING ASYNCHRONOUS MAIN STORE ACCESSES IN A MULTIPROCESSING SYSTEM USING VIRTUAL STORAGE

BACKGROUND OF THE INVENTION

This invention relates to apparatus and methodology which facilitates interaction among central processing units (CPUs) in a multiprocessing system in the control of page frames. The invention enables each CPU to complete its current use of operands in a page frame even though the page frame has been marked by another CPU in the multiprocessing system as not available for subsequent use. The invention does this by maintaining the addressability to each required page frame for the duration of each instruction regardless of any changes in the translation tables in storage and regardless of any changes in the translation lookaside buffer during that instruction.

The invention can be applied where plural CPUs independently contend for main store resources in a multiprocessing system using demand-paging and virtual storage operations. A page frame is a hardware component of main store in which a page can be copied from an I/O device. The number of page frame components in a main store are limited. Whenever an operand is required by the current instruction in any CPU, and the operand is not in main store, a page-demand interrupt is generated by the CPU so that the system can transfer the page containing the operand from an I/O device into a page frame component in main store. If all page frame components are then in use, the system can deallocate one of the page frames and reallocate it for the new page having the required operand. The deallocated page may also have been used by one or more other CPUs. If the deallocation occurs in the middle of execution of a current instruction in another CPU having incomplete results obtained thus far, a cessation of execution for that instruction may leave incorrect results. In this manner, incorrect data may be provided in a CPU output, due to the asynchronous interference of CPUs in the multiprocessing system. Furthermore if the system should recognize the incomplete execution, and later retry the instruction after the page is again brought back into main store, a reduction in efficiency occurs for the multiprocessing system due to the thrashing of this page in regard to the instruction suppressed at some intermediate point in its execution.

OBJECTS AND BRIEF SUMMARY OF THE INVENTION

It is therefore a general object of this invention to prevent incorrect results in the execution of instructions due to asynchronous operations among the CPUs in a multiprocessing system.

It is another object of this invention to improve the efficiency of multiprocessor operations by eliminating the necessity for reexecution of an instruction as a result of asynchronous operations of CPUs in a multiprocessing system.

It is a further object of this invention to eliminate one of the causes of interference among plural CPUs in a multiprocessing system.

It is a more specific object of this invention to force a multiprocessing system to continue the addressability to and the availability of a page frame until completion of execution of current instructions in all of its CPUs, even though the page frame may be invalidated for deallocation so that it can be allocated to another CPU which has an asynchronous requirement for a page frame.

This invention provides a unique control circuit with special buffer hardware to assure the addressability of operands needed for completing the execution of current instructions in the respective CPUs of a multiprocessing system which found the operands accessible at the beginning of execution of the current instructions, even though the addressability to the operands is lost elsewhere in the system, such as by asynchronous invalidation of the addressability in a translation table entry for these operands. As a result, the invention avoids the practice of simultaneously suspending processing on all CPU whenever a page demand interrupt occurs, and thus permits the invalidation and subsequent rollout of a deallocated page to be handled as a coordinated activity in the system after the current instruction activity is completed in all CPUs.

The "current instruction" of any CPU is defined herein as the instruction having its operand(s) addressed by the use of an AAB register(s).

DESCRIPTION OF THE DRAWINGS

The foregoing and other objects, features and advantages of the invention will be more apparent from the following more particular description of the preferred embodiment of the invention illustrated in the accompanying drawings of which:

FIG. 3 is a flow diagram of operations by any CPU initiating a page frame invalidation in a multiprocessing system containing this invention.

FIG. 4 is a flow diagram of operations by other CPUs in a multiprocessing system responding to a page frame invalidation initiated by a CPU executing the operations shown in FIG. 3.

FIG. 5 is a timing diagram showing a particular example of CPU coordination when using the invention in a multiprocessing system.

FIG. 6 shows a format for a segment table (ST) entry.

FIG. 7 shows a format for a page table (PT) entry and a table lookaside buffer (TLB) entry.

THE PRIOR SYSTEM USED BY THE PREFERRED EMBODIMENT

Figure 1:
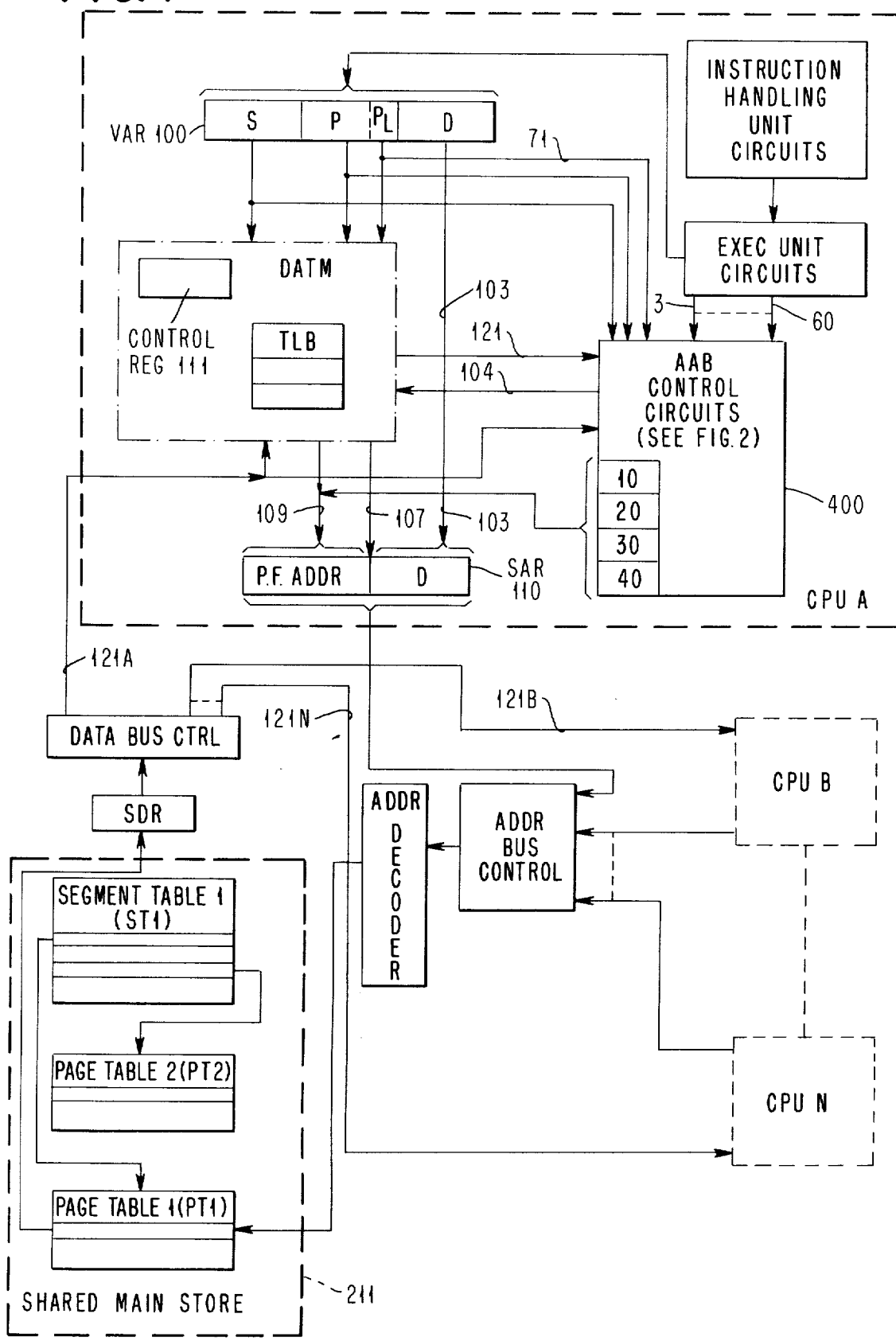
FIG. 1 illustrates a conventional virtual address type of multiprocessing system including novel address availability buffer (AAB) control circuits in each of the CPUs.

FIG. 1 shows how the subject invention generally fits into otherwise commercially available multiprocessing systems, such as IBM System/370 and OS/VS2 Release 2. FIG. 1 includes a plurality of CPUs A, B . . . N connected to a shared main store 211. Each CPU includes conventional components, such as an instruction handling unit, an execution unit, a virtual address register (VAR) 100, a storage address register (SAR) 110, a control register 111, and a dynamic address translation mechanism (DATM) which includes a translation lookaside buffer (TLB). The operation of each of these units is well known, and they combine to provide what is commonly known in the digital computer arts as a virtual address demand-paging system.

The invention incorporates address availability buffer (AAB) control circuits 400 into this combination of well known circuits comprising each CPU. That is, the invention integrates the AAB control circuits with the DATM, which is the demand-paging mechanism normally found with virtual addressable computer systems.

Because of the dependency of this invention on the prior system, a substantial effort is made herein to describe the related features and characteristics of the prior system which are used by this invention. In demand-paging systems, a unit of data measure, called a page, is read from an I/O device into a page frame hardware component of a main store: (1) in response to a demand for a next instruction by the CPU when the instruction is not in main store, or (2) in response to a demand for an operand by a current instruction beginning its execution in a CPU when the operand is not then available in main store. A brief description of demand-paging is next provided in order to aid a better understanding of the background to this invention.

In commercial CPUs which can be virtual addressing, the addresses of storage operands in machine instructions are provided as virtual addresses, sometimes called logical addresses, when the CPU is in virtual address mode. Virtual address demand-paging mechanisms are currently in public use in commercial IBM computer systems, such as in the S/370 M158 or M168 for example. See the "IBM System/370 Principles of Operation," form number GA22-7000-3 published February 1973, which supports S/370 CPUs such as the IBM 3158 and 3168. Before the machine can access an operand with a virtual address, the machine must translate the virtual address into a main store address, sometimes called a real address. Commercial machines can usually operate in either virtual address mode or real address mode, which is determined by the setting of a mode bit in the current program status word (PSW) of the CPU.

As previously mentioned, a demand-paging operation is used to bring a required operand or instruction into main store from an I/O device when demanded by a CPU. To do this, the system locates the page on an I/O device and uses entries in a segment table (ST) and a page table (PT) to store addressability to the page after it is put in main store. This involves the assignment of a page frame address in main store, putting the page frame address into a PT entry, and transferring the page from the I/O device into the assigned page frame. The address of the assigned page frame is also transferred from the PT entry into a TLB entry in DATM which is used for subsequently addressing that page frame. If there is no free page frame available when one is needed, the system deallocates a least-frequently used page frame, and assigns it to receive the page.

In more detail, whenever an operand is required that cannot be accessed through any valid page frame address in a current TLB or PT entry, a page-demand interrupt signal is generated to initiate a demand-paging operation. This interrupt signal initiates the page frame allocation program to assign a page frame in the main store, moves the page into that page frame, and sets up a PT entry with the assigned page frame address and sets its flag bits to valid and assigned; see FIG. 7. That is, the PT entry selected to contain the new PF address has its unassigned flag bit and its invalidity flag bit both set off to indicate the PT entry is assigned and contains a valid page frame address. At a time thereafter, DATM hardware copies the PT entry into a TLB entry in the respective CPU.

In order to speed the allocation of page frames to pages, the memory allocation program attempts to keep a list of free page frames. However, there are far fewer page frames in main store than there are pages located on I/O devices, and there are times when there are no free page frames, i.e., all have been allocated to the different CPUs. As a result of this continuing CPU contention for page frames, the allocation of page frames to pages must be offset by deallocation of the lesser-used page frames to best satisfy the contention conflicts. The deallocation of a page frame requires making the page that occupies the page frame inaccessible for further translation; and then the contained page, if changed, must be stored on an I/O device for future use.

Upon deallocation, the PT entry for a page is flagged as invalid and unassigned by setting on its invalidity and unassigned flag bits; see FIG. 7. A demand-paging request occurs for any operand or instruction using a PT entry that has its invalidity flag bit set on.

In commercial multiprocessing systems, the invalidation indication of a page frame (i.e. by setting on its PT entry invalidity bit) is communicated to all CPUs using that page. To do this, four things are done (1) each CPU in the system must be signalled to temporarily discontinue using any page frame which may be subjected to invalidation, and each CPU must wait until all others have signalled back that they have complied with the request; (2) the invalid flag bit for the page frame is set in such a way that any subsequent instruction using the page frame is cancelled; (3) each CPU purges its TLB of all entries; and (4) if the page is changed, it is read out onto an I/O device.

The overall operation of the conventional DATM is next described briefly in order to better understand its relationship to the invention. In response to a virtual address from its CPU, DATM substitutes the assigned page frame address in main store for the corresponding segment and page virtual address components. In FIG. 1, the virtual address is supplied to a virtual address register (VAR) 100 from the execution unit, which generates the virtual address in the well known manner from the operand address components in the current instruction supplied by the instruction handling unit. The DATM apparatus uses the segment tables and page tables which reside in the shared main store 211.

In each CPU, the content of control register 111 addresses the location of the segment table currently being used by that CPU. Each entry in the segment table (ST) has the form shown in FIG. 6, which includes a field containing an address of a page table (PT). The PT address in a ST entry is valid only if the PT invalid flag bit is set to 0 to indicte a PT is assigned to that ST entry. If the PT invalid flag is set to 1; the PT address is invalid, and a segment exception is generated to signal that no page table exists for the ST entry. The PT entry and TLB entry format are shown in FIGS. 7 and 8; they include an address of a page frame. The page frame (PF) address in the PT entry is valid if the PF invalid bit is set to 0. If this PF bit is set to 1, the contained page frame address is not valid, which means that the related page frame cannot be used.

Each DATM also includes the translation lookaside buffer (TLB) which is used by DATM to maintain the main store addresses corresponding to virtual addresses that have been most recently referenced, which enhances the speed of obtaining the most frequently used main store addresses. Hence the TLB hardware entity speeds up the storage accessing operations. The TLB is used in the referencing of all types of virtual addresses, including both operand and non-operand types of addresses. As a result of the general use of the TLB and the overlapped nature of the CPU, the operation of replacing entries in the TLB is such that a particular entry may be replaced at any time during the execution of an instruction within IBM System/370 CPUs.

As shown in FIG. 1, VAR 100 contains the virtual address for an operand, or for a non-operand such as the next instruction to be fetched from main store. To do this the virtual address is first translated into a main store address. A virtual address (VA) is comprised of a segment address component S, a virtual page address component P, and a byte displacement D in the page. The VA translation begins with the segment table (ST) located by the main store address in control register 111. First the segment address component S is used as an index in the ST to locate the required ST entry. The ST entry contains the main store address which locates the required page table (PT). The virtual page address component P is used as an index in the PT to locate the required PT entry; and the PT entry, if marked valid and assigned, contains the address of the page frame (PF) in main memory containing the operand or instruction. The PT entry contains the high order 12 bits of the main store address, and the low order bits of the address are all zeros. The displacement D is a byte index in both the virtual page and the page frame to the location of the required operand or instruction.

The assigned flag bit in the PT entry in FIG. 7, if set to 1, indicates that the addressed page frame is allocated to a CPU. If the assigned flag bit is set to 0, the PT entry is not assigned and it therefore can be assigned to any CPU. Further detail on the DATM operation may be found in the published literature for the commercially available IBM S/370 virtual storage systems.

FIG. 8 shows the TLB entry format, which include the S and P components needed to perform the search of the TLB to find any existing associated TLB.

GENERAL DESCRIPTION OF THE PREFERRED EMBODIMENT

In FIG. 1, the illustrated embodiment of this invention contains address availability buffer (AAB) control circuits in each CPU of the multiprocessing system. The AAB control circuits contain four AAB registers 10, 20, 30 and 40 which receive and maintain the main store addresses corresponding to the virtual addresses required for the current instruction in execution. The AAB registers are updated synchronously with the instruction stream executed by the respective CPU during the pretest portion of the instruction execution.

The AAB control circuits can improve the efficiency of the multiprocessing system whenever a page frame is invalidated at a time unexpected by the execution state of any CPU.

AAB registers 10, 20, 30 and 40 are used to hold the page frame address(es) for operand(s) needed by the instruction currently being executed.

An instruction access does not require any AAB register, since execution of an instruction is easily cancelled if all, or a portion of the instruction, lies in an unavailable page. Thus the page frame address for an instruction is only put into SAR 110 in the conventional manner.

However, each operand has a pair of AAB registers available, i.e. registers 10 and 20 comprise a pair for use by one operand, and registers 30 and 40 comprise a pair for use by another operand.

Depending on the instruction type, the instruction may have zero, one, or two operands, which may use zero, one, two, three or four of the AAB registers.

The illustrated two pairs of AAB registers support instructions having up to two operands in the main store, in which each operand can cross a page boundary. That is, each pair of registers support one operand which may be located, for example, in two page frames in main store. This arrangement can support any operand starting at any location, provided it does not exceed one page in length. This is sufficient since the operands of most instructions are limited to lengths less than this, and those instructions which have longer operands are designed to be resumable at any point in the execution after an interruption. The two AAB registers in a pair may be designated an even register and an odd register, in relation to the parts of an operand found in sequential virtual pages having even and odd page addresses, or odd and even page addresses.

The loading of AAB registers with an operand PF address is done by the CPU at the time it transfers the PF address from a required PT entry to a TLB entry; which is also the time during which the addressed operand is initially accessed using the PF address in the required PT and TLB entries. Thereafter the operand(s) is accessed with the PF address in the AAB register(s).

The crossing of a page frame boundary is indicated by the changing of the low-order bit $P_L$ in the page virtual address component P in VAR 100. The crossing occurs when the VA for the next page is placed into VAR 100 while the CPU continues to signal the same operand request. Then the main store address for the second page frame is placed into the other AAB register of the pair. If the operand's PF address cannot be obtained because an exception signal is encountered during the operation of DATM, the instruction execution is cancelled and none of its results is permitted to be stored.

As previously mentioned, after the AAB registers are loaded, only the valid PF addresses contained in the AAB are used in the execution of the current instruction, and no references are then made through the ST, PT or TLB as long as the same content validly remains in VAR 100.

The loading of the operand PF address(es) into the AAB assures the availability of the main store operand address(es) for the using CPU for the duration of the current instruction's execution, even though during the execution another CPU may make the corresponding PT entry invalid.

It is noted that the TLB entry is not marked invalid at the instant that the corresponding PT entry is marked invalid, because the marking of the TLB entry awaits the actuation of CPU hardware to perform the operation. Hence the addressability in the TLB might appear valid for a period after the corresponding addressability in the PT is lost. But the TLB entry's addressability can not be relied upon, because it may be made invalid at any time during the execution of the current instruction. However, the AAB addressability can be relied upon to be maintained throughout the current instruction's execution period. Hence the AAB avoids any unpredicatability in the results of the instruction's execution that would be caused by invalidation of the PT or TLB entry at a time during execution when use is made of the page frame designated by those table entries.

Figure 2:
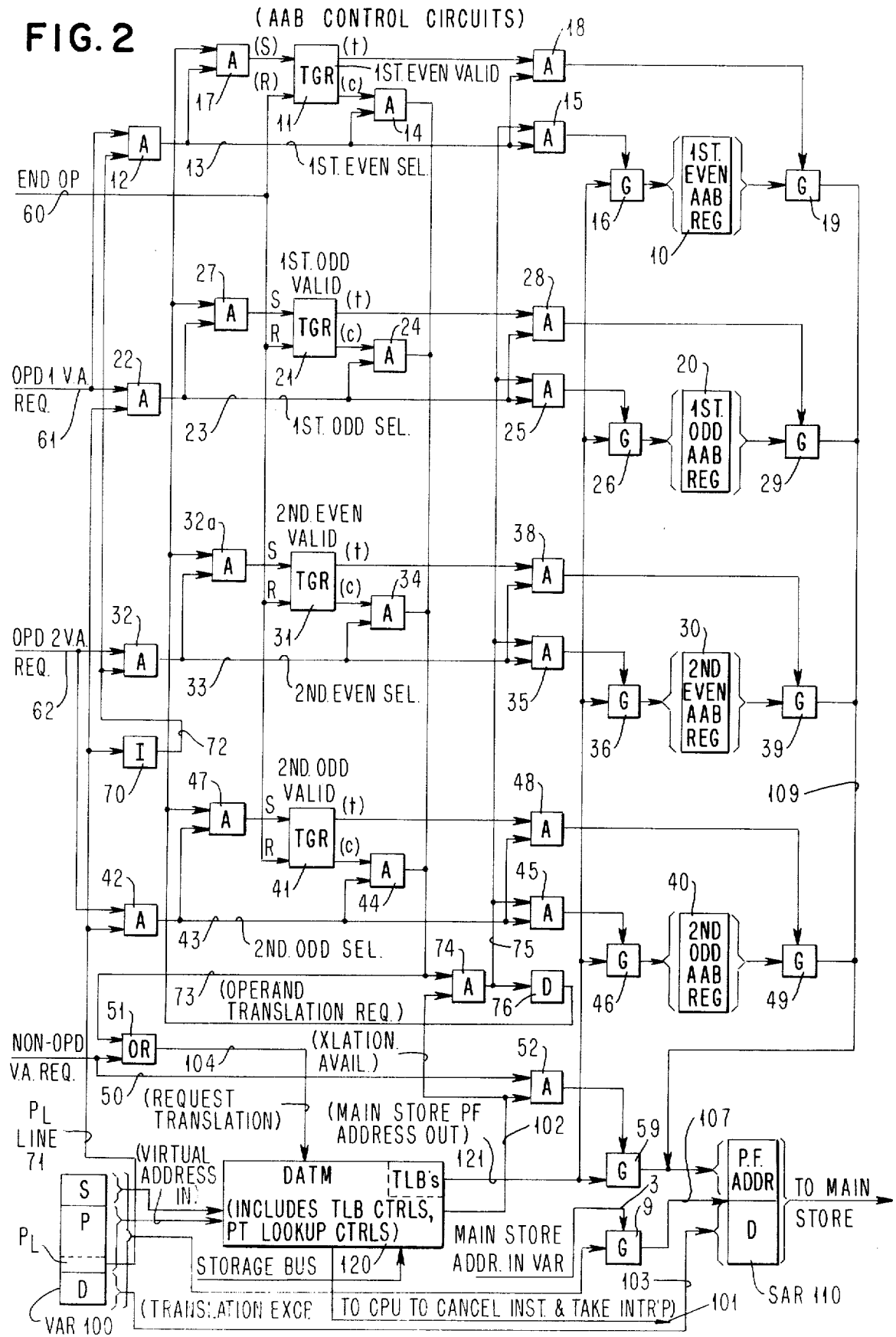
FIG. 2 is a circuit drawing of AAB control circuits.

The entries in the AAB registers in FIGS. 1 and 2 (like the PT and TLB entries) contain only a page-frame address, which is the high-order part of the main store address, e.g., on the high-order 12 bits of a 24 bit address. The low-order part of the main store address is directly transferred to the SAR 110 from the byte displacement (D) field in the VAR 100. The page frame address and the D field are combined in the main store address register (SAR) 110 in FIGS. 1 and 2 to generate the main store address of the operand or instruction, which is provided to the main store address hardware in order to access the operand.

DETAILED DESCRIPTION OF THE PREFERRED EMBODIMENT

The AAB control circuits are shown in FIG. 2. They are organized in such a way that they require a minimum amount of control lines from the CPU. In present commercial systems without any AAB, the CPU contains, among other things, the lines 3 through 60 shown in FIG. 1 provided by the CPU execution unit. The AAB is connected to lines 3 through 60 which are shown in detail in FIG. 2 as input control lines 60, 61, 62, 50 and 3. The end op line 60 is electrically pulsed when the execution of the current instruction is ended. The OPD1 VA request line 61 is pulsed when the current instruction makes its first operand (OPD1) request while the CPU is operating in virtual address mode, i.e. the execution unit is then outputting the first operand's virtual address to VAR 100. The OpD2 VA request line 62 is pulsed when the current instruction makes its second operand request while the CPU is operating in virtual address mode.

The non-OPD VA request line is pulsed when the CPU is requesting a non-operand store access, such as an instruction fetch; it uses DATM but does not use any AAB register. The main-store address request line 3 is pulsed when the address provided to VAR 100 is a main store address; and it therefore can be directly put into SAR 100, without using either the DATM or the AAB circuits. Whenever a main store access request signal is received on line 3 from the CPU, the signal on line 3 is applied to a gate 9 which causes the S and P fields in VAR 100 to be gated directly into the PF field in SAR 100.

In FIG. 2, a virtual address in register 100 comprises the segment address component S, the page address component P, and the page displacement field D, however a real address in VAR 100 provides the page frame address in the S and P fields.

The content of register 100 is not affected by address translation, and it provides the input to a conventional address translation operation. Field D in VAR 100 is transferred directly into the D field of main store address register (SAR) 100 with no gating therebetween. The segment address S and page address P components of the virtual address are inputted to the dynamic address translation mechanism (DATM) 120 which translates them into a corresponding main-store page-frame address, which is outputted on main store PF address out line 121 to AAB register gates 16, 26, 36 and 46.

The AAB circuits include validity triggers 11, 21, 31 and 41 which are respectively associated with the four registers 10, 20, 30 and 40. Each trigger is reset by an end op signal on line 60 upon the completion of execution of the current instruction, the reset state indicates that the associated AAB register does not contain a valid PF address.

The CPU activates required signals on control lines 3 through 60 at the beginning of the execution of the current instruction, so that if any address translation exception interrupt signal is generated by the DATM on its output line 101, it must occur early enough to permit all results of the current instruction to be cancelled. The translation exception interrupt signal is generated by DATM when a particular VA cannot be translated because no assigned or available PF address is found in the PT or TLB. This early portion of the instruction execution is conventionally called "pretesting."

During pretesting the CPU translates by means of the ST, PT and TLB entries all virtual addresses to be used in the instruction execution, and the AAB registers are used for operand accessing after pretesting for the remainder of the instruction execution.

Therefore the page frame address for an operand is provided by DATM to the AAB in the early portion of execution for the current instruction.

The choice of which AAB register in a pair is selected to be loaded with a currently provided address on line 121 is determined by whether the virtual page address in VAR 100 is even or odd, which is indicated by the signal on $P_L$ line 71 provided from the lowest-order bit position in the P field of register 100. The line 72 output of inverter 70 is activated by an even P field content since the $P_L$ bit is then set to the 0 current level; but line 71 is activated by an odd P field content which sets $P_L$ to the 1 current level.

A non-operand differs from an operand in that the non-operand either uses a main store address, e.g. its addres does not require translation, or it is an instruction which is fetched prior to operand pretest and hence its execution can be terminated at any time during its fetch which is before any results have been stored for the instruction.

When an instruction (or other non-operand) is to be accessed in VA mode, the CPU pulses a non-operand virtual address (NON-OPD VA) request signal on a line 50 through an OR circuit 51 to actuate the address translation mechanism 120.

Whenever a virtual address is put into VAR 100, the DATM 120 outputs on line 121 the main store page frame address corresponding to the S and P components of the virtual address in register 100, when a corresponding page frame has been assigned. This is indicated by a translation available signal being provided on a line 102. If no page frame was assigned, a translation exception signal is provided on line 101 to the CPU, so that the CPU can provide a page demand interrupt signal.

The virtual storage operand access request signals on line 61 and 62 are separately provided by the CPU to distinguish whether the address in VAR 100 is for a first or a second operand of the current instruction. Line 61 is activated for the first operand and enables a selection by the $P_L$ line 72 or 71 in the first pair of AAB registers 10 and 20. Line 62 is activated for the second operand and enables a selection by the $P_L$ line 72 or 71 in the second pair of AAB registers 30 and 40.

The following example illustrates the internal operation of the AAB circuits:

Assume that an end op signal has just occurred on line 60 indicating completion of the last instruction execution. It resets all of the validity triggers 11, 21, 31 and 41.

Now assume that the CPU has just pulsed a signal on OPD1 VA line 61, and that the $P_L$ bit in virtual address register 100 is 0 indicating an even-numbered content in virtual page field P. The 0 signal on line 71 to inverter 70 activates its output line 72. AND circuit 12 is therefore enabled by active lines 61 and 72, and its output line 13 provides a first even selection signal to condition AND circuits 17, 14 and 15.

Since trigger 11 is now in a reset state, its complementary output (c) enables the AND circuit 14 to energize line 73 to provide an operand translation request signal through OR circuit 51 to DATM 120. If the translation is available, line 102 is activated; but if it is not available, the CPU is signalled on line 101 to generate a page demand interruption. Assuming that the translation is available, line 102 and line 73 activates an AND circuit 74; and its output line 75 activates AND circuit 15 which then conditions gate 16 to transfer the main store PF address provided on bus 121 into the first even AAB register 10. The signal from AND circuit 74 is also delayed through delay circuit 76 and shortly thereafter enables AND circuit 17 to set the first even validity trigger 11 to its valid state, indicating the content of register 10 is valid. This activates the (t) output of trigger 11 (and deactivates its (c) output) to enable AND circuit 18 and therefore gate 19 transfers the valid content of the AAB register 10 into the PF field in SAR register 110.

When the current instruction completes its execution, the execution unit activates the end op line 60, which resets trigger 11 to indicate an invalidity state for the content of AAB register 10, and AND 18 deactivates gate 19 to block the connection between register 10 and SAR 110.

If a subsequent instruction requests its first operand from an odd numbered page address P in VAR 100, its $P_L$ bit is set to 1, which will deactivate line 72. But now line 71 activates AND circuit 22 and the first odd selection line 23 which enables AND circuits 24, 74, 25, and 26, and then enables AND circuit 27, sets trigger 21, and enables AND circuit 28 and gate 29 in precisely the same manner as previously described for circuits 12, 14, 15, 16, 17, 11, 18 and 19. As a result, gate 29 continuously supplies the odd page frame address from register 20 to SAR 110.

If an instruction requests a second operand, line 62 is activated, which enables the selection of AAB register 30 or 40 according to whether $P_L$ line 71 signals an even or odd P field, respectively. The circuits connected with triggers 31 and 41 operate in precisely the same way that was previously described for the circuits connected with triggers 11 and 21.

When the operand includes a sequence of bytes, the byte address in the D field in VAR 100 is normally sequentially changed in the CPU, and the D field in SAR 110 correspondingly changes.

If the possibility exists that the operand may cross a page frame boundary, the CPU must make a pretest to ensure that both pages are available before leaving the cancelable portion of the instruction. This can be accomplished by accessing both the first and last byte of the operand. During these two accesses, the low-order $P_L$ bit in VAR 100 changes when the operand extends into the next sequential virtual page in the same segment. Then field P in VAR 100 is changed by the CPU to the next page; and DATM 120 provides another main store page frame address on line 121 corresponding to the new S and P combination in VAR 100. Hence the reversal in the state of the $P_L$ bit signal on line 71 puts the new page frame address on line 121 into the other AAB register of the pair. The AAB circuits operate in the same manner as previously described to support a page boundary crossing, except that the end op line 60 is not activated, so that the first validity trigger to be set in the pair remains set after the second trigger is set. However the last activated output gate 19, 29, 39 or 49 for the first page frame is blocked, due to the last active selection line 13, 23, 33 or 43 being deactivated by the change in the state of the $P_L$ bit in VAR 100. Hence both registers of the pair have the valid PF addresses for the operand but after the boundary crossing only the second activated AAB register of the pair outputs into SAR 100.

METHODS OF OPERATION FOR THE DETAILED EMBODIMENT

The novel AAB circuits shown in FIGS. 1 and 2 are supported by the programmed methods shown in FIG. 3 and 4. The method in FIG. 3 communicates a page invalidation to the other CPUs in a multiprocessing system. The method in FIG. 4 permits the other CPUs to respond in an asynchronous manner that permits each CPU to complete the execution of its current instruction even though it may be using the invalidated page frame. The method in FIG. 4 prohibits the removal of the corresponding page frame until all CPUs have completed their current instruction execution. That is, the AAB circuits in FIG. 2 assure that addressability is maintained to the page frame(s) being used by each CPU's current instruction; while the support programs in FIGS. 3 and 4 assure that the page in the addressable page frame is not removed from main store until all CPU's have completed execution of their current instructions. This combined operation assures predicatable results from the execution of current instructions during which PF invalidation occurs, and avoids the need to suppress and repeat the execution of any current instruction due to PF invalidation.

In FIGS. 3 and 4, a shared coordination count field (CCF) provides a means for assuring that the pertinent page frame is available after its invalidation until its use is completed by all current instructions. The CCF also provides a means for controlling which CPU is assigned the system task of doing the deallocation act of moving the page from the pertinent page frame to an I/O device (i.e. if the page has been modified and hence is different from that found on the I/O device from which it was originally copied into the page frame). If the page was not modified, it need not be moved out, since an exact copy remains on the I/O device from which it was obtained. Then a new page can be moved into the allocated page frame. The new page overlays and therefore destroys the old page in the page frame.

FIG. 3 shows the programmed operations by any CPU which initiates the invalidation of a pertinent page being used by other CPUs. (For example, the invalidation may be caused by a demand for a page by CPU A which results in the system deallocating a page frame which is currently being used by CPUs B and C.) When any CPU generates a page demand interrupt, it initiates a conventional system control interrupt handler program which connects to the programmed method in FIG. 3 that communicates the PT entry invalidation to all other CPUs in the multiprocessing system. Then the initiating CPU executes an S/370 purge TLB instruction (step 301) which erases the TLB in this CPU. This prevents the initiating CPU from using its TLB until it receives new entries. Then this CPU initializes the CCF (step 302) with a signal representing a number which is one less than the number of CPUs in the multiprocessing system. Then each other CPU is signalled (step 303) by the initiating CPU that the pertinent page frame is invalidated. The CPU does the signalling by executing an S/370 signal processor (SIGP) instruction to each of the other CPUs. The SIGP instruction execution transmits an order code to each of the other CPUs to communicate the invalidated PT entry. The SIGP communication also transmits an interruption request to each of the other CPUs to generate an interrupt upon completion of execution of its current instruction in order to asynchronously initiate the programmed method shown in FIG. 4.

After receiving the SIGP interrupt request and order code, each of the other CPUs completes its current instruction using the addressability in its AAB registers, which may address the invalidated page frame. Upon completion of its current instruction, each of the receiving CPUs is interrupted and thereupon senses the received order code provided by the initiating CPU.

Thus when each CPU receives an order code and an interrupt request from a SIGP instruction, the CPU completes its current instruction before it interrupts to sense the order code to find that a page was invalidated.

Since the CPUs are asynchronous with each other, a completion of an instruction by one CPU does not means that any other CPU has necessarily completed its current instruction, since different instructions can take different amounts of time to complete in the same type of CPU, and different CPU types operate at different rates. Hence the different CPUs using the invalidated page frame may complete their current instruction at different times and be interrupted by the SIGP instruction request at the asynchronous times. The method in FIG. 4 is therefore initiated by each CPU as it interrupts at an asynchronous time.

The method in FIG. 4 determines when the page frame can no longer be used by any CPU and determines which CPU will write out the page on an I/O device if the page has been modified.

The method in FIG. 4 starts by performing step 401 which purges the TLB in its CPU (e.g. executes a purge TLB instruction) to prevent its further use until refilled with one or more new entries. Step 402 transfers the CCF content to a general register R1, and step 403 loads the R1 content into another general register R3. Then step 404 decrements by one the CCF content in register R3. The CPU that decrements R3 to zero will be the last CPU to have needed the invalidated page, and it is the CPU which will be assigned the task to move out any modified page to the I/O device.

Steps 402, 403 and 404 set up the registers needed for execution of an IBM S/370 compare and swap (CS) instruction by step 406. Thus in steps 402 and 403, the CPU loads the CCF contents into registers R1 and R3 and then step 404 decrements by one the count in R3. The CS instruction is then executed by step 406 with the operands R1, R3 and the storage operand CCF at a given $B_2$, $D_2$ address.

Since the different CPUs asynchronously access the CCF field, it is possible that one or more other CPUs accessed the same CCF content, decremented it, and stored it back into the CCF field, which if unknown to the other CPUs would make the CCF value unreliable. The CCF use can be made reliable if the decrementing CPU knows that the CCF content has not been changed between the time it put the CCF content into register R1 by step 402 and the time the CS instruction is executed by step 406. The CS instruction detects if the CCF was changed between step 402 and step 406 by comparing the CCF existing in main store at the time of step 406 to the earlier obtained CCF value in R1 obtained by step 402. If the CS instruction finds them to be the same, the CCF content could not have been changed by any CPU since it was obtained by step 402; and then the CS instruction stores into the CCF the decremented value in R3. No other CPU can access the main store while the CPU is executing a CS instruction; hence no other CPU can interfere with the CCF between the time the CS instruction compares R1 and CCF, and when it stores the decremented R3 content into CCF. This assures the reliability in the use of the CCF, and obtains CPU coordination in the decrementing of the CCF content by the different CPUs.

In more detail, in one uninterruptable operation which locks out storage access by all other CPUs in a conventional S/370 multiprocessor, the CS instruction compares the contents of R1 and the CCF; and if equal, the CS instruction places the decremented R3 content into the CCF location in main store; but if R1 and CCF compare unequal, the CS instruction loads R1 with the current value of CCF (this action indicates that in the time between steps 402 and 406 some one or more other CPUs has decremented the CCF). The S/370 condition code of the CS instruction indicates whether it detected an equal or unequal condition during its execution.

Step 407 detects if any CPU interference had occurred with the CCF by testing the condition code set by execution of the CS instruction. The condition code is found in the program status word of the respective S/370 CPU. If step 407 finds the condition code is 0, no interference has occurred because the CCF content did not change between steps 402 and 406. If the condition code is found to be set to 1, interference was detected, and the new CCF value exists in R1. Then the execution of the CS instruction is repeated with this new CCF value in R1 by reentering step 403 which places the contents of R1 into R3. The step 404 is executed and the CS instruction is again executed by step 406 to determine if the new CCF value has been interfered with by some other CPU between the last execution of step 406 and the current execution of the same step 406.

If step 407 again finds CPU interference, step 403 is again reentered; and this loop repeats until step 407 finds no interference, i.e. until it finds a condition code of 0.

Then step 408 tests the value in R3 to sense if the CCF content has been decremented to zero to determine if this CPU is the last to complete its current instruction. If the CCF content is not zero, the invalidated page frame is still being used by the current instruction in some other CPU, and this CPU returns to processing without the use of the invalidated page frame, for which it no longer has any addressability, because upon completion of the current instruction the end op line 60 is pulsed by this CPU which resets to invalid state all of the triggers 11, 21, 31 and 42 in FIG. 2 which blocks the outputs of all AAB registers 19, 29, 39 and 49.

When step 408 finds zero content in R3, it indicates to this CPU that all CPUs have completed their use of the invalidated page frame content, and that this CPU was the last to use it, since it did the final decrementing to zero. As a result, this CPU executes step 409 to test if the invalidated page content was modified. An IBM S/370 CPU does this by sensing the state of a change bit for this page frame, which is bit 6 in the S/370 key in storage for the invalidated storage block. One storage block is used for a 2048 byte page frame used in some S/370 systems, and two storage blocks are used for a 4096 byte page frame used in other S/370 systems. The change bit for the pertinent storage block(s) is tested by executing an S/370 RRB (Reset Reference Bit) instruction for each storage block comprising this page frame. If a condition code of 1 or 3 results from the RRB execution, the change bit is set, and step 410 is entered to move the page in this page frame to an I/O device. If the condition code is 0 or 2 the page was not changed, and the NO exit is taken from step 409, since the page frame need not then be moved out.

The method in FIG. 4 ends by the CPU returning from the last executed step 408, 409 or 410 to the program interrupted by the PF invalidation which initiated the method in FIG. 3. The CPU can again obtain the moved out page, if it is still needed by the program, by having the page put into some other allocated page frame. This will automatically occur as a result of a page demand interrupt if a subsequent instruction requires an operand in the page which is not available in main store.

FIG. 5 provides a timing diagram of an example of operations in a multiprocessing system having CPUs A, B and C, each having its own TLB and AAB hardware of the type shown in FIGS. 1 and 2. The timing diagram in FIG. 5 represents a situation when CPU A generated a page demand interrupt signal which initiated the deallocation of a page frame that contained a page having operands being used by current instructions in CPUs B and C.

Thus CPU A invalidates a PT entry and initiates the system control routine previously described for FIG. 3, and CPUs B and C each respond at different asynchronous times by each executing the system control routine previously described for FIG. 4. Thus CPU A executes a purge TLB instruction (step 301), initializes the CCF (step 302) with the value two, i.e. the number of other CPUs in this multiprocessing system, and then executes two SIGP instructions (step 303) which send order codes and interruption requests to CPUs B and C. Then CPU A shifts its activity to the process which it interrupted before entering the method shown in FIG. 3. The order codes and interruption requests cause each receiving CPU to interrupt and asynchronously initiate the system control routine shown in FIG. 4 as soon as it completes the execution of its current instruction.

It may be noted that it is important to purge the TLB even if the current instruction is not using the invalidated page frame, since the TLB may nevertheless contain an entry for the invalidated page frame.

In summary, CPUs B and C each operate asynchronously with each other and with CPU A. Hence as shown in FIG. 5, each CPU interrupts at a different time independent of the other CPUs in the system, and each interrupt occurs when a CPU completes execution of its current instruction. That interrupt, when it occurs in CPUs B and C, initiates the system control program routine shown in FIG. 4, and consequently CPUs B and C execute the steps in FIG. 4 at different times. In this example, CPU B is the CPU that decrements to zero the CCF in main storage, and accordingly CPU B senses that it is the last CPU which could have needed the invalidated page frame. Hence CPU B is selected to move out the page to an I/O device.

It is apparent that any number of pairs of AAB registers and their respective AAB control circuits can be used to support instructions having up to that number of operands, without a theoretical maximum limit on the number of operands.

While the invention has been particularly shown and described with reference to a preferred embodiment thereof, it will be understood by those skilled in the art that the above and other changes in form and details may be made therein without departing from the spirit and scope of the invention.

What is claimed is:

1. Apparatus for maintaining operand addressability to a page frame in a main store for current instructions in CPUs of a multiprocessing system using virtual storage addressing and demand-paging interruptions, in which each CPU has a virtual address register and an address translation means which provides main store addresses correspondng to virtual storage addresses received from the CPUs for addressing and accessing operands in a page within a page frame; and each CPU having lines for electrically signalling the CPU's requirements including a plurality of operand request lines, and an end operation line, apparatus in each CPU comprising a plurality of pairs of address availability registers, a plurality of availability control triggers respectively provided for the address availability registers, means for connecting a reset input of each control trigger to the end operation line, in order to reset the control triggers with an electric current provided on the end operation line to signal the end of execution for the current instruction, means for gating into a selected one of the availability registers a main store address provided by the address translation means, the virtual address register containing a page component with a low-order bit position, true and inverted output lines provided from the low-order bit position, the output of the virtual address register being connected to the input of the address translation means, a main store address register receiving the output of the translation means, a displacement component of the virtual address register being connected to a displacement component of the main store address register, a plurality of pairs of AND circuits, in which both AND circuits in each pair have inputs connected to a respective one of said plurality of operand request lines, one AND circuit in each pair also having an input connected to the true output line and the other AND circuit in the same pair also having an input connected to the inverted output line, and means for connecting the output of each AND circuit to a gating means at an input of a respective one of said address availability registers while the respective control trigger is in a reset state, means for connecting a set input of a respective one of said availability control triggers to the output of a respective one of the AND circuits, second gating means respectively connecting outputs of said availability registers to a main store address register, and the second gating means having an input conditioned by the set state of an associated control trigger.

2. Apparatus as defined in claim 1 in which each CPU also has a non-operand request line, said apparatus also including a gating circuit connecting a page frame address output of said address translation means to the main store address register, and said gating circuit having an input conditioned by a non-operand signal current level on said non-operand request line, whereby said gating circuit permits the non-operand addresses to bypass the address availability registers.

3. Apparatus for maintaining operand addressability to one or more page frames in a shared main store for current instructions in CPUs of a multiprocessing system after invalidation of a page frame, in which each CPU has a virtual address register and an address translation means which provides main store addresses corresponding to virtual storage addresses received from the CPUs for accessing operands in page frames; and each CPU contains a plurality of operand request lines, and an end operation line, apparatus in each CPU comprising a plurality of address availability registers, a plurality of availability control triggers respectively provided with the address availability registers, means for connecting a reset input of each control trigger to the end operation line, in order to reset the control triggers when an instruction end current level is provided on the end operation line, means for gating into a selected one of the availability registers a page frame address being provided by the address translation means, the virtual address register containing a page component with a low-order bit position, true and inverted output lines provided from the low-order bit position, the output of the virtual address register being connected to an input of the address translation means, a plurality of AND circuits respectively associated with said address availability registers, in which each AND circuit has an input connected to one of said plurality of operand request lines, each AND circuit also having an input connected to the true or inverted output line for said low-order bit position, means for respectively connecting set inputs of said availability control triggers to output signal lines of the AND circuits, and plural gating means having inputs conditioned by a set output of a respective one of said control triggers, said gating means respectively connecting outputs of said address availability registers to a page frame input of a main store address register.

4. In a multiprocessing system having a plurality of CPUs requiring operand addressability to page frames in a shared main store for executing current instructions of the CPUs, in which each CPU has a virtual address register and an address translation means which provides main store addresses for accessing operands in page frames; and each CPU contains a plurality of operand request lines, and an end operation line, each CPU in the system including a plurality of address availability registers capable of storing page frame addresses, a plurality of availability control triggers respectively provided with the address availability registers, means for connecting a reset input of each control trigger to the end operation line, in order to reset the control triggers when a signal is provided on the end operation line indicating an end of execution for the current instruction of the CPU, means for gating into a selected one of the availability registers a page frame address provided by the address translation means, the virtual address register containing a page component with a low-order part, respective tate output lines provided from the low-order part, the output of the virtual address register being connected to an input of the address translation means, a plurality of groups of AND circuits, each AND circuit being associated with a different one of said address availability registers, in which each AND circuit in a group has an input connected to a respective one of said plurality of operand request lines, each AND circuit in each group also has an input connected to a different one of the respective state output lines, means for connecting a set input of a respective one of said availability control triggers to an output signal line from an associated one of the AND circuits, plural gating means respectively having inputs conditioned by a set output of a respective one of said control triggers to respectively connect outputs of said address availability registers to a page frame input of a main store address register, whereby operand accessing by current instructions uses the page frame addresses provided to the main store address register by said address availability registers.

* * * * *